(12) United States Patent
Heida et al.

(10) Patent No.: US 11,884,349 B2
(45) Date of Patent: Jan. 30, 2024

(54) SPACER FOR SPACING A HEADSET FROM A STEM OF A BICYCLE

(71) Applicant: Koninklijke Gazelle N.V., Dieren (NL)

(72) Inventors: Sierd Heida, Dieren (NL); Richard Hofs, Dieren (NL)

(73) Assignee: KONINKLIJKE GAZELLE N.V.

( * ) Notice: Subject to any disclaimer, the term of this patent is extended or adjusted under 35 U.S.C. 154(b) by 240 days.

(21) Appl. No.: 17/325,553

(22) Filed: May 20, 2021

(65) Prior Publication Data

US 2021/0362795 A1 Nov. 25, 2021

(30) Foreign Application Priority Data

May 20, 2020 (NL) .................................. 2025632

(51) Int. Cl.
*B62J 11/13* (2020.01)
(52) U.S. Cl.
CPC ..................................... *B62J 11/13* (2020.02)
(58) Field of Classification Search
CPC .................................... B62J 11/13; B62J 11/10
See application file for complete search history.

(56) References Cited

U.S. PATENT DOCUMENTS

| | | | | |
|---|---|---|---|---|
| 4,753,448 A * | 6/1988 | Nagashima | ............... | B62L 3/02 74/489 |
| 6,015,118 A * | 1/2000 | Oda | ........................ | B62J 11/13 248/65 |
| 9,409,618 B2 * | 8/2016 | Lanz | ....................... | B62K 21/06 |
| 9,446,812 B2 * | 9/2016 | Nago | ...................... | B62K 21/12 |
| 9,615,472 B1 * | 4/2017 | Calfee | ....................... | B62J 11/19 |
| 9,701,293 B2 * | 7/2017 | D'Aluisio | ............... | B62K 19/30 |
| 10,710,670 B2 * | 7/2020 | Lund | ....................... | B60T 11/046 |
| 10,926,827 B2 * | 2/2021 | Süsse | ....................... | B62J 11/13 |
| 10,953,948 B2 * | 3/2021 | Vandermolen | ............. | B62L 3/02 |
| 2015/0298759 A1 * | 10/2015 | Lanz | ....................... | B62K 21/06 280/279 |
| 2018/0118300 A1 * | 5/2018 | Lin | ......................... | B62K 21/02 |
| 2019/0092417 A1 * | 3/2019 | Süsse | ....................... | B62K 21/02 |
| 2019/0367121 A1 * | 12/2019 | Vandermolen | ........... | B62M 25/02 |

* cited by examiner

*Primary Examiner* — Kevin Hurley
*Assistant Examiner* — Michael R Stabley
(74) *Attorney, Agent, or Firm* — Mendelsohn Dunleavy, P.C.

(57) ABSTRACT

Spacer for spacing a headset from a stem of a bicycle. The spacer comprises a cable guide, in particular for brake cables and gear shift cables. The cable guide is provided with a cable guide opening and a cable guide wall enclosing the cable guide opening. The cable guide wall is interrupted by a cable insertion gap, allowing lateral insertion of a cable. Optionally, the cable guide comprises cable retaining means for retaining an inserted cable within the cable guide opening.

20 Claims, 2 Drawing Sheets

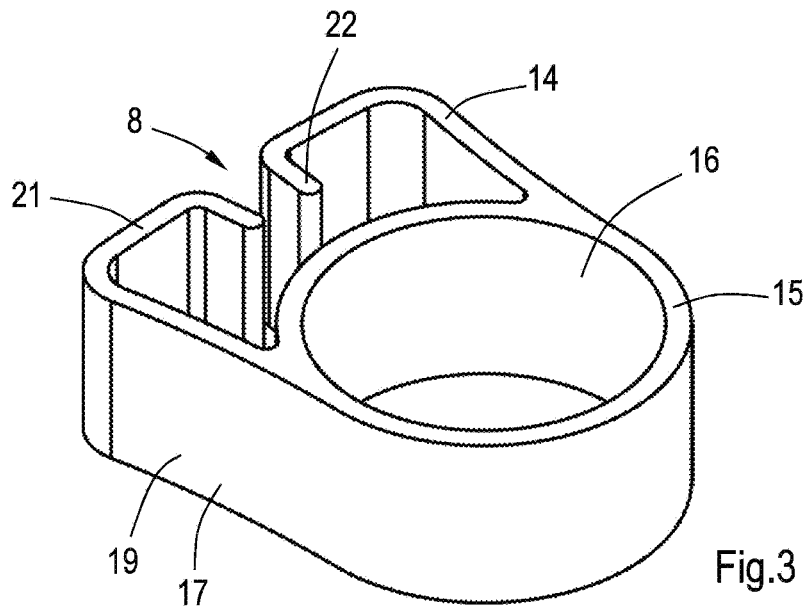
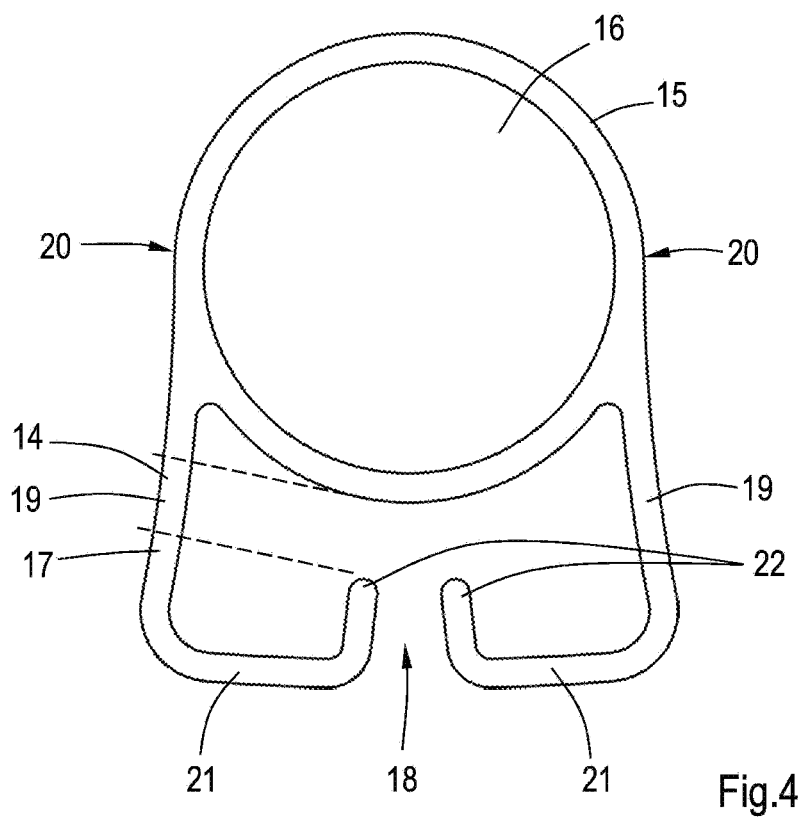

SPACER FOR SPACING A HEADSET FROM A STEM OF A BICYCLE

BACKGROUND OF THE INVENTION

The present disclosure relates to a spacer for spacing a headset from a stem of a bicycle and to a bicycle provided with such a spacer. Such a spacer typically comprises a ring to be positioned between the headset and the stem of the steer. If a user wants to adjust the height of the steer, first the stem is disassembled and then the spacer is placed on the ball head or removed.

US 2018/0222546 discloses a spacer with an annular body combined with a cable guide. The cable guide is a U-shaped element that can be coupled to the annular body. The cable guide serves to guide electric cables and/or Bowden cables for brakes and/or gear.

SUMMARY OF THE INVENTION

It is an object of the invention to provide a spacer with a cable guide allowing easier assembling and mounting of the cables.

The object of the invention is achieved with a spacer for spacing a headset from a stem of a bicycle comprising a cable guide with a cable guide opening and a cable guide wall around the cable guide opening, the wall being interrupted by a gap. The gap serves as a lateral cable entry extending along the full axial length of the spacer, enabling to insert a cable in a sideward direction, e.g., after connecting the cable to the respective control element on the steer.

The cable guide can be provided with cable retaining means for retaining an inserted cable within the cable guide opening, such as hooks, snap fit elements and/or texture increasing frictional resistance of an interior side of the cable guide wall.

In a specific embodiment, the cable guide wall comprises one or more resilient arms, so the gap can elastically be widened during insertion of a cable. The cable guide wall can for example comprise two or more resilient arms with end tips spaced from each other to form the gap. In a more specific embodiment, the resilient arms can be symmetrically shaped and arranged. The resilient arms can for example be hook-shaped arms. Such hook-shaped arms can for example have end tips which are bent inward, in order to protect the cables against sharp edges.

The resilient arms may extend from a tubular section dimensioned to allow passage of a steering tube. The tubular section can be cylindrical, e.g. to smoothly join the headset tube, but other tubular outlines can also be used.

The arms can for example join the tubular section at diametrically opposite sides of the tubular section in order to create a relatively wide cable guide opening.

Optionally, the arms have an outer surface which is flush with the outer surface of the tubular section.

In a specific embodiment, the arms can diverge, e.g., at an angle of 10-15 degrees to improve elastic movability of the arms and easier insertion of the cables.

The tubular section and the resilient arms can for example be integrally formed as a single part. Combining the spacer function and the cable guide function in a single part considerably simplifies assembly.

To simplify production of the spacer, the resilient arms and the tubular section can for example have a substantially even wall thickness, at least in cross section and/or in any longitudinal section.

The gap may be parallel to the tube axis of the tubular section, or it may make an angle with this axis as long as the gap enables lateral insertion of the cable.

The spacer can for example have a cross section which is the same over its entire axial length. This allows production of the spacer as an extruded profile.

The spacer can be made of any suitable material, such as a plastic material or a metal, e.g., aluminium.

The spacer can be made in different axial lengths, in order to accurately position the steer at a desired height.

The spacer can be used for any vehicle comprising a stem and a headset, in particular a bicycle. In the context of the invention a bicycle is to be understood as any vehicle comprising a steer with a stem and a headset, such as a conventional bicycle, a cargo bike, a trike, a step scooter, a motor scooter, a motor cycle or the like.

After assembling the bicycle, the spacer can freely rotate about the steering tube, or it can be fixed, e.g., to the steering tube, e.g., in the same way as is generally done with bicycle lamp supports.

The above-described aspects will hereafter be more explained with further details and benefits with reference to the drawings showing an exemplary embodiment.

BRIEF DESCRIPTION OF THE DRAWINGS

FIG. 3: shows the spacer of FIG. 1 as a separate part in isometric view;

FIG. 4: shows the spacer of FIG. 3 in top view.

DETAILED DESCRIPTION OF THE INVENTION

Figure 1:
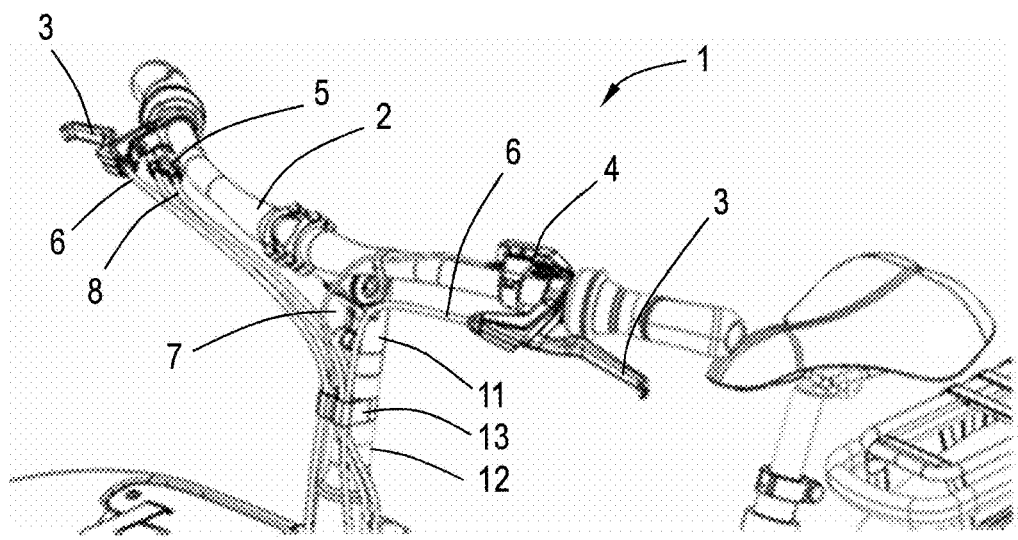
FIG. 1: shows a steering section of a bicycle comprising a spacer according to the invention.
Figure 2:
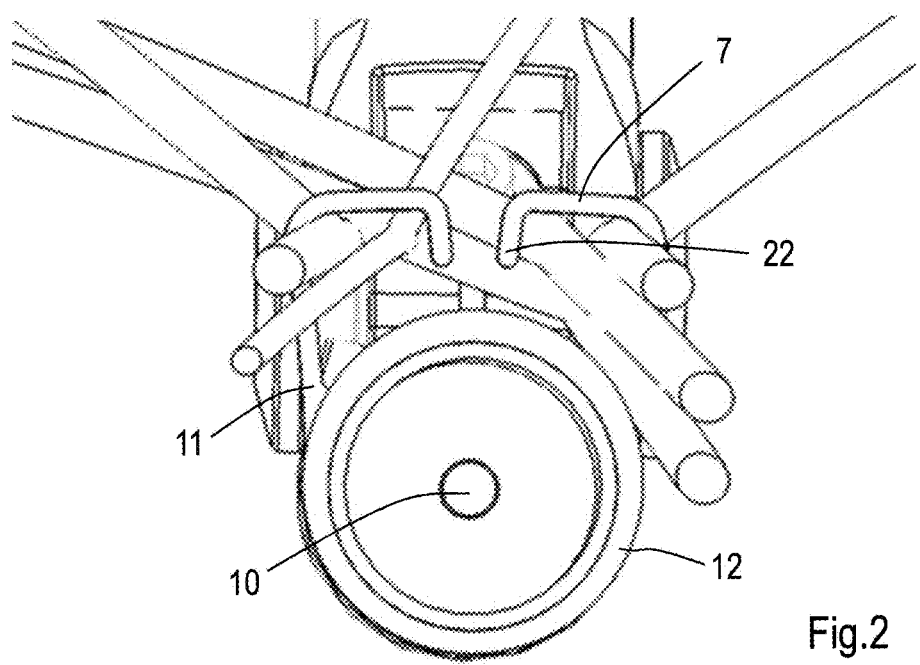
FIG. 2: shows a bottom view of the steering section of FIG. 1.

FIGS. 1 and 2 show a steering section 1 of a bicycle comprising a handle bar 2 carrying a pair of brake levers 3, a display 4 and a gear shift control element 5.

Brake cables 6 run from the respective brake levers 3 to the front and rear brakes (not shown). A cable 7 feeds the display 4. A gear shift cable 8 runs from the gear shift control element 4 to the gear shift mechanism (not shown).

A stem 11 connects the handle bar 2 to a steering tube 10 (FIG. 2) rotatably received in the head set tube 12. Hence, the stem 11 is coaxial and rotatable relative to the headset tube 12 so as to enable steering motion by turning the handle bar 2.

A spacer 13 is placed between the stem 11 and the headset tube 12, in order to space the stem 11 from the top end of the head set tube 12 at a desired height. This way, the handle bar 2 can be positioned at a desired level for a bicycle of a specific size.

The spacer 13 is shown apart in FIG. 3 and in top view in FIG. 4. The spacer 13 comprises a cable guide section 14 and a cylindrical tubular section 15 for receiving the steering tube. The cable guide section 14 and tubular section 15 are integrally formed as a single part. The cable guide section 14 comprises a cable guide opening 16 and a two resilient hook-shaped arms 17 forming a cable guide wall enclosing the cable guide opening 16 and interrupted by a gap 18.

The two resilient hook-shaped arms 17 are symmetrically arranged and shaped. The hook-shaped arms 17 have root portions 19 joining the tubular section 15 at diametrically opposite sides of the tubular section 15. The root portions 19 have outer surfaces which are flush with the outer surface of the tubular section 15. The other ends of the root portions 19 connect to respective hook portions 21, which are substantially perpendicular to the respective root portions 19. The hook portions 21 of the two resilient hook-shaped arms 17 extend into each other's direction.

The hook portions 21 of the resilient hook-shaped arms 17 have end tips 22 which are bent inward, so as to point towards the tubular section 15. The bent end tips 22 are spaced from each other to define the gap 18. The bent end tips 22 are free of sharp edges and allow easy insertion of cables. The bent end tips 22 help to prevent unintentional release of the cables from the cable guide section 14.

In the shown embodiment, the resilient hook-shaped arms 17 diverge at an angle of about 13 degrees. Due to the perpendicular arrangement of the hook portion 21, the bent end tips 22 are also inclined by essentially the same angle, resulting in a slightly narrowing gap 18. The smallest width of the gap 18 is slightly less than the width of a cable to be inserted. Pushing a cable through the gap 18 will gradually push aside the resilient hook-shaped arms 17.

As shown in FIG. 4, the resilient hook-shaped arms 17 and the tubular section 15 have a substantially even wall thickness in cross section and over the entire length in axial direction. Consequently, the cross section of the spacer 12 is the same over the entire axial length. In this respect, the axial direction is the direction of the cylindrical axis of the tubular section 15. The gap 18 is parallel to the cylindrical axis of the tubular section 15. These features allow production of the spacer 13 by extrusion.

During assembly of the bicycle, the spacer 13 is positioned between the headset tube 12 and the stem 11 and receives the steering tube. Subsequently, the cables 6, 7 8 are connected to the respective control elements 3, 4, 5. In a next step the cables 6, 7, 8 are pulled through the gap 18 of the cable guide 14 of the spacer 13 and held in the cable guide opening 16.

The disclosure is not restricted to the above described embodiments which can be varied in a number of ways within the scope of the claims.

The invention claimed is:

1. A spacer for spacing a headset from a stem of a bicycle, the spacer comprising a tubular section for receiving a steering tube and a cable guide with a cable guide opening and a cable guide wall enclosing the cable guide opening, the cable guide wall being interrupted by a cable insertion gap,
wherein the cable guide wall comprises a pair of arms, each said arm extending from the tubular section to an end tip, and
the end tips of the pair of arms are spaced from each other to form the cable insertion gap.

2. The spacer according to claim 1, further comprising cable retaining means for retaining an inserted cable within the cable guide opening.

3. The spacer according to claim 2, wherein the arms are symmetrically arranged hook-shaped arms with hooks forming the cable retaining means.

4. The spacer according to claim 3, wherein the end tips of the hook-shaped arms are bent inwardly.

5. The spacer according to claim 2, wherein the cable retaining means comprise a texture increasing frictional resistance of an interior surface of the cable guide wall.

6. The spacer according to claim 1, wherein the arms join the tubular section at diametrically opposite sides of the tubular section.

7. The spacer according to claim 6, wherein the arms have an outer surface which is flush with the outer surface of the tubular section.

8. The spacer according to claim 7, wherein the arms diverge.

9. The spacer according to claim 6, wherein the arms diverge.

10. The spacer according to claim 1, wherein the arms have an outer surface which is flush with the outer surface of the tubular section.

11. The spacer according to claim 1, wherein the arms diverge.

12. The spacer according to claim 1, wherein the tubular section and the arms are integrally formed as a single part.

13. The spacer according to claim 12, wherein the arms and the tubular section have a substantially even wall thickness, at least in cross section.

14. The spacer according to claim 1, wherein the gap is parallel to the tube axis of the tubular section.

15. The spacer according to claim 14, wherein the spacer has an axial length and a cross section which is the same over the entire axial length.

16. The spacer according to claim 1, wherein the spacer is formed as an extruded profile.

17. The spacer according to claim 1, made of plastic material or a metal.

18. The spacer according to claim 1, having at least two cable guide openings.

19. A vehicle comprising a stem and a headset, wherein the stem is spaced from the headset by a spacer according to claim 1.

20. The spacer according to claim 1, wherein the arms are resilient.

* * * * *